United States Patent

Marantette et al.

[11] 3,976,386
[45] Aug. 24, 1976

[54] DRILL HEAD GUIDING CONTROL FOR MULTIPLE DRILLS

[76] Inventors: William F. Marantette; Ruth B. Marantette, both of 20624 Earl St., Torrance, Calif. 90503

[22] Filed: Mar. 25, 1975

[21] Appl. No.: 561,853

[52] U.S. Cl. ............................... 408/43; 408/52; 408/88; 408/136; 408/236
[51] Int. Cl.² .................... B23B 39/18; B23B 47/00
[58] Field of Search ................ 408/42, 43, 52, 88, 408/236, 131, 136; 83/555, 599

[56] References Cited
UNITED STATES PATENTS
1,996,443  4/1935  Pierre .............................. 83/599
FOREIGN PATENTS OR APPLICATIONS
922,204  11/1954  Germany ............................ 408/43

*Primary Examiner*—Leon Gilden
*Attorney, Agent, or Firm*—Ralph B. Pastoriza

[57] ABSTRACT

A frame structure supports a work surface above which there is provided an elongated head number supporting a series of drills. A torque tube having an axis parallel to and spaced from a line passing through the series of drills is mounted to the frame structure for rotation about its axis. The drill head member is coupled to the torque tube such that rotation of the torque tube initially swings the head member in an arc and thereafter urges the head member through a lost motion coupling arrangement against a pair of spaced parallel guide rails, secured to the frame structure normal to the work surface so that the remaining travel of the drill head is rectilinear. The stiffness of the torque tube assures that one end of the elongated drill head will not move ahead or drop behind the other end so that all holes are drilled simultaneously.

4 Claims, 5 Drawing Figures

DRILL HEAD GUIDING CONTROL FOR MULTIPLE DRILLS

This invention relates generally to drilling apparatus and more particularly to a drill head guiding control for a multiple drill operation.

BACKGROUND OF THE INVENTION

The present invention has numerous applications. However, for purposes of the present specification, the invention will be described in conjunction with the simultaneous drilling of a series of printed circuit boards.

In the manufacture of printed circuit boards, one operation includes that of drilling a number of holes in the circuit board at specified points. These holes will receive the electrical leads from various electrical components to be assembled on the board. Usually, a plurality of boards are simultaneously drilled in accord with a master positive film defining the specific locations of the drill holes. Towards this end, a work surface is mounted to a base frame for movement in fore and aft and sidewise directions; that is, along the directions of an orthagonal coordinate system. All of the boards on the work surface can thus be positioned simultaneously and by providing a multiple drill head, a first set of holes in a specific position on each board can be simultaneously drilled.

When a large number of boards are drilled simultaneously, the multiple drill head is necessarily elongated to accommodate a series of drills in side-by-side relationship. In order that all of the holes be as identical as possible in the respective boards, it is desirable that the elongated multiple drill head itself be brought down towards the work in such a manner that the respective drills move through precisely the same distances. Towards this end, it is necessary that the opposite end portions of the elongated head move equal distances toward the work.

The foregoing desired operation can pose certain mechanical problems in the mounting of the drill head for such movement. Normally, a pair of spaced parallel rails normal to the work surface are provided for guiding opposite end portions of the elongated head towards the work. However, the absolute straightness and parallel relationship of the rails cannot always be maintained and when the rails are bridged by a relatively long drill head member, twisting or canting may occur which will result in the undesirable movement of one end portion of the drill head member ahead or behind the other so that all of the drills do not engage the various circuit boards simultaneously.

BRIEF DESCRIPTION OF THE PRESENT INVENTION

With the foregoing in mind, the present invention contemplates a drill head guiding control for multiple drills which in essence assures that all of the series of drills supported by the head move through precisely the same distances when the head is guided towards the work with the desirable end result that the holes are all uniformly drilled.

Briefly, the invention comprises a base frame for supporting a work surface. An elongated head member in turn is provided supporting a series of drills. A torque tube having an axis parallel to and spaced from a line passing through the series of drills is mounted to the frame for rotation about its axis. Connecting means laterally extend from adjacent opposite peripheral ends of the torque tube and are coupled adjacent to opposite end portions of the head member respectively such that rotation of the torque tube swings the head member through an arc towards the work surface.

The stiffness of the torque tube assures that opposite end portions of the elongated multiple drill head member will simultaneously move through precise equal distances.

In addition to the torque tube, the preferred embodiment of the invention includes a pair of spaced, parallel guide rails secured to the frame in a position normal to the work surface. Rail engaging means secured adjacent to opposite ends of the elongated head member are positioned to engage the guide rails after arcuate movement of the head from a first arcuate position to a second arcuate position. The respective connecting means include a lost motion coupling means at the coupling points to the head such that the head can move rectilinearly in the direction of the rails upon further arcuate movement of the torque tube towards a third position.

The lost motion coupling of the connecting means to the head is such that the torque tube still performs its function of assuring that the opposite ends of the elongated head member move through precisely equal distances during this latter rectilinear motion along the guide rails.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
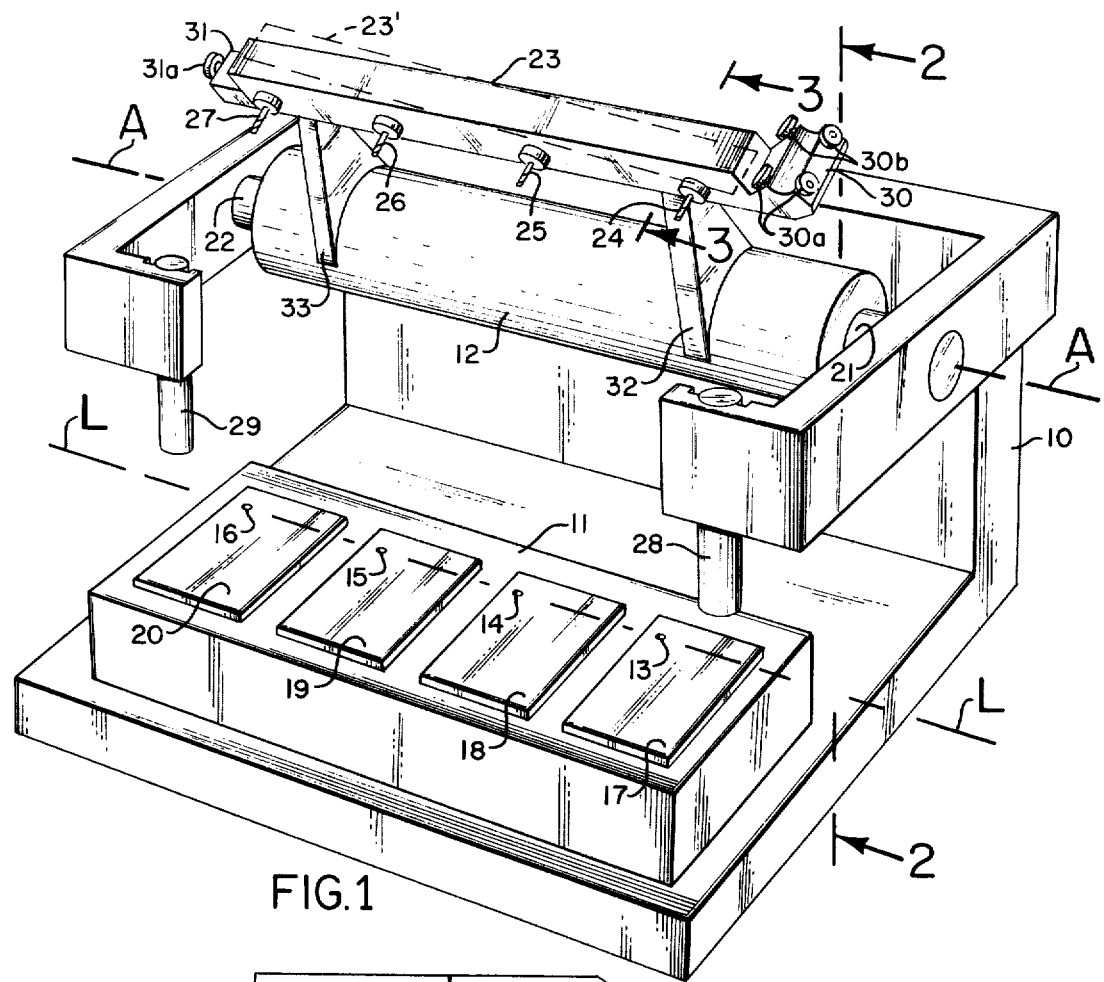
FIG. 1 is a perspective view of the drill head guiding control for multiple drills in accord with the present invention.

Referring first to FIG. 1 there is designated at the upper right a base frame 10 supporting a work surface 11. While the work surface 11 is depicted simply as a block it is to be understood that this work surface may include a mounting for movement in a fore and aft direction and in a sidewise direction so that points on the work surface can be positioned to correspond with desired rectangular coordinates.

Shown above and to the rear of the work surface 11 is a cylindrical torque tube 12 having an axis A—A parallel to the plane of the work surface 11 and also parallel to a straight line designated L—L passing through a series of holes 13, 14, 15 and 16 to be drilled simultaneously through material such as a plurality of printed circuit boards 17, 18, 19 and 20 respectively positioned on the work surface. The torque tube 12 itself is mounted to the base frame 10 for rotation about its A—A axis as at 21 and 22.

An elongated head member 23 serves to support a series of drills 24, 25, 26 and 27 aligned in side-by-side relationship in a direction parallel to the axis A—A. As will become clearer as the description proceeds, this head member 23 is arranged to be guided over a portion of its movement by first and second guide rails 28 and 29 secured to the base frame 10 in parallel relationship normal to the work surface 11 and spaced apart in a direction parallel to the torque tube axis A—A.

The guide rails 28 and 29 are arranged to be engaged respectively by first and second rail engaging means 30 and 31 adjacent to opposite ends of the elongated head 23 so that the head is guided for rectilinear movement in a direction towards the work surface when engagement occurs.

In the position illustrated in FIG. 1, the elongated head 23 is solely supported by first and second rigid members 32 and 33 extending laterally from opposite peripheral portions of the torque tube 12 towards the elongated head. These connecting means, as will become clearer as the description proceeds, include lost motion coupling means for coupling the extended ends of the first and second rigid members to the elongated head. Essentially, the head is supported for arcuate movement upon rotation of the torque tube through the various positions.

Figure 2:
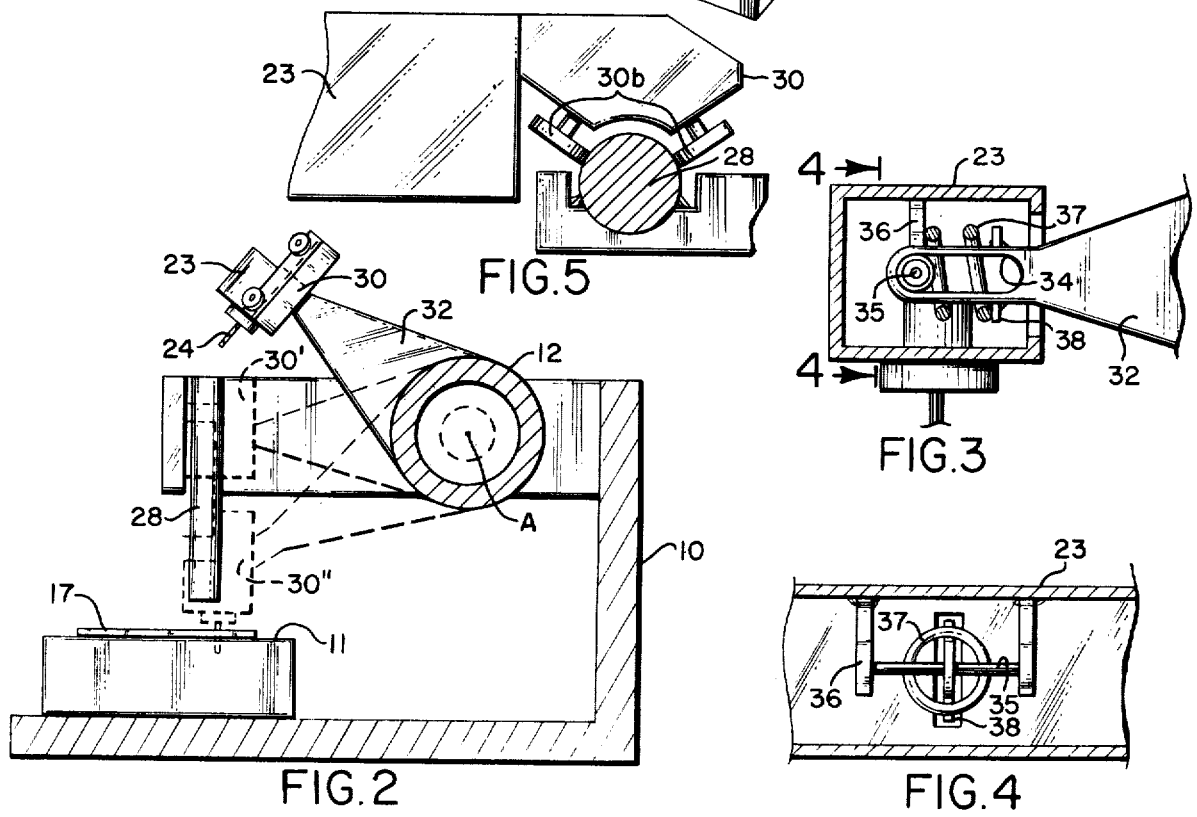
FIG. 2 is a cross section looking in the direction of the arrows 2—2 of FIG. 1.

Referring to the cross section of FIG. 2, the foregoing will be better understood wherein there is illustrated in solid lines the drill head 23 and first rail engaging means 30 in a first arcuate position free of the first guide rail 28. When the torque tube 12 rotates in a counter-clockwise direction, the rail engaging means 30 will engage the guide rail 28 when it reaches a second arcuate position designated in dotted lines at 30'. After engagement with the guide rail 28, continued counter-clockwise rotation of the torque tube will cause the rail engaging means 30 and drill head 23 to move in the heretofore described rectilinear direction towards the work surface 11 along the guide rails to a third arcuate position designated 30''. Since the extreme end of the first rigid member 32 as shown in FIG. 2 necessarily moves in an arc when the torque tube 12 is rotated as described, there is necessary a lost motion coupling between the end of the rigid member and the head 23.

The foregoing lost motion coupling means will be described by referring to the fragmentary cross section of FIG. 3. It will be understood that an identical lost motion coupling means is provided at the end of the second rigid member 33 described in FIG. 1.

Figure 3:
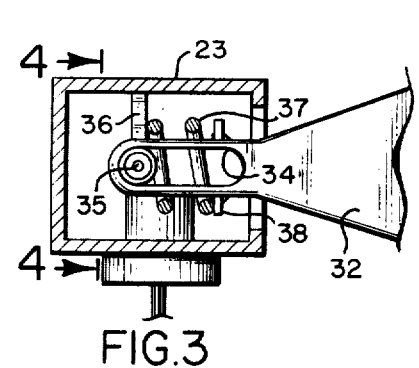
FIG. 3 is a fragmentary cross section taken in the direction of the arrows 3—3 of FIG. 1.

Referring to FIG. 3, it will be noted that the end of the rigid member 32 terminates in an elongated slot 34 through which a pin 35 transversely extends in a direction generally parallel to the axis A—A of the torque tube as described in FIG. 1. This pin 35 passes through a bearing which engages the upper and lower edges of the slot 34, the pin itself being secured to the head 23 as by a suitable support 36.

The lost motion coupling means is completed by the provision of a biasing means in the form of a compression spring 37 between a suitable stop 38 on the end of the rigid member 32 and the pin 35.

Figure 4:
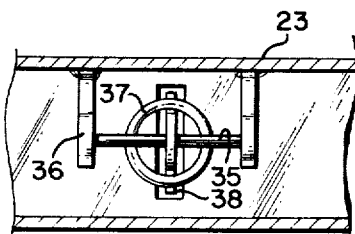
FIG. 4 is a fragmentary cross section in the direction of the arrows 4—4 of FIG. 3; and, FIG. 5 is a fragmentary plan view partly in cross section of one of the rail engaging portions of the control of FIG. 1.

In the front view of the structure as illustrated in FIG. 4, the support of the pin 35 to the head 23 as by the support 36 will be evident as well as the manner in which the front portion of the spring 37 bears against the pin 35.

It will be appreciated from the structure described in FIGS. 3 and 4 that the head 23 will be biased to its furthest position from the axis A—A of the torque tube; that is, the pin 35 and associated bearing will be at the extreme left end of the slot 34 as viewed in FIG. 3.

Referring once again to FIG. 2, when the rail engaging means 30 and the second rail engaging means 31 described in FIG. 1 engage the respective guide rails 28 and 29, the head 23 and pin will be moved closer to the axis A—A of the torque tube, the biasing spring 37 of FIG. 3 being compressed slightly so that the rail engaging means are urged into positive engagement with the rails.

As the arcuate movement of the torque tube continues so as to position the head and rail engaging means 30 at the successive second and third positions 30' and 30'' shown in FIG. 2, the cross pin 35 in the head 23 will move outwardly towards the extreme end as depicted in FIG. 3. In other words, the changing of the motion of the head from an arcuate motion to a rectilinear motion between the second and third positions described in FIG. 2 is accommodated by movement of the pin in the slot 34.

Figure 5:
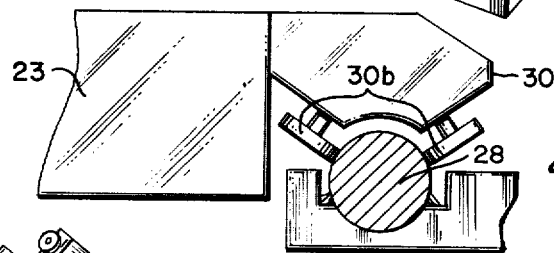

FIG. 5 illustrates in further detail the first rail engaging means 30 wherein it will be noted that pairs of tandem rollers engage the rail as indicated at 30a and 30b in FIG. 1. The rollers in each pair, such as the pair 30b as clearly depicted in FIG. 5 engage circumferentially spaced points on the guide rail 28.

The second rail engaging means 31 as shown in FIG. 1 only includes a single roller 31a engaging the other guide rail 29.

With the foregoing arrangement, redundancy is avoided so that the exact movements of the drill head 23 and associated rail engaging end portions will be determined by the movement of the torque tube and the coupling to the head member, the roller arrangement preventing any binding in the event the rails are not exactly parallel or straight.

OPERATION

In operation, the torque tube 12 of FIG. 1 will normally support the head 23 in the first position shown free of the guide rails 28 and 29. When it is desired to simultaneously drill holes in the boards 17 through 20, the torque tube 12 is rotated in a counter-clockwise direction as viewed in FIG. 2 to the second position indicated at 30' for the rail engaging means 30 so that engagement of the first and second rail engaging means with rails 28 and 29 takes place. As described heretofore, the compression spring 37 in the lost motion coupling means as shown in FIG. 3 will bias the rail engaging means into positive engagement with the rails so that further rotation of the torque tube 12 results in the drill head 23 moving in a rectilinear motion along the rails normal to the various printed circuit boards on the work surface 11.

Referring specifically to FIG. 3, it will be noted that the top edge of the slot 34 is in continuous engagement with the bearing surrounding the pin 35. The slots at the ends of the rigid members 32 and 33 both move through precisely the same distances because of the stiffness of the torque tube 12. Therefore, the downward component of force on the cross pin such as the pin 35 effects the movement of the drill head 23 along the guide rails and the opposite end portions as well as all intermediate portions of the head and thus the series of drills will accordingly move through precisely equal distances. In other words, any twisting or canting of the elongated drill head 23 shown in FIG. 1 to, for example, the dotted line position 23' is prevented.

From the foregoing description, it will thus be evident that the present invention has provided an improved drill head guiding control for multiple drills wherein certain problems associated with prior art multiple drill heads have been avoided.

We claim:

1. A drill head guiding control for multiple drills comprising, in combination:
   a. a base frame for supporting a work surface;
   b. an elongated head member supporting a series of drills;
   c. a torque tube having an axis parallel to and spaced from a line passing through said series of drills, said torque tube being mounted to said frame for rotation about its axis;
   d. connecting means laterally extending from adjacent opposite peripheral ends of said torque tube and coupled adjacent to opposite end portions of said member respectively such that rotation of said torque tube swings said head through an arc towards said work surface, the stiffness of said torque tube assuring that the opposite end portions of said elongated head member will simultaneously move through precise equal distances;
   e. a pair of spaced, parallel guide rails secured to said frame in a position normal to said work surface; and
   f. rail engaging means secured adjacent to opposite ends of said elongated head member positioned to engage said guide rails when said head arcuately swings from a first position to a second position, said connecting means including a lost motion coupling means at the coupling points to said head such that said head can move rectilinearly in the direction of the rails upon further arcuate movement of said torque tube towards a third position.

2. A drill head guiding control for multiple drills comprising, in combination:
   a. a base frame supporting an elongated work surface;
   b. a cylindrical torque tube having an axis parallel to the plane of said work surface and to a straight line passing through a series of holes to be simultaneously drilled through material positioned on said work surface, said torque tube being mounted on said base frame for rotation about said axis;
   c. an elongated head member supporting a series of drills aligned in side-by-side relationship in a direction parallel to said axis;
   d. first and second guide rails secured to said base frame in parallel relationship normal to said work surface and spaced apart in a direction parallel to said axis;
   e. first and second rail engaging means secured respectively adjacent to opposite ends of said elongated head for engaging the rails and guiding said head for movement in a rectilinear direction towards said work surface;
   f. first and second rigid members extending laterally from opposite peripheral end portions of said torque tube towards said elongated heads; and,
   g. first and second lost motion coupling means coupling the extending ends of said first and second rigid members to said elongated head for supporting said head for arcuate movement upon rotation of said torque tube from a first position in which the rail engaging means are free of said rails to a second position in which said rail engaging means are in engagement with said rails, said lost motion coupling means including biasing means urging said head away from the axis of said torque tube so that said rail engaging means are urged into continuous positive engagement with said rails as said torque tube is further rotated beyond said second position towards a third position, said drills being moved rectilinearly into said material as said head is guided along the rails during the arcuate movement from the second to third position, said coupling means assuring that opposite end portions of said head move along said rails through precisely equal distances.

3. The subject matter of claim 2, in which the extending ends of said first and second rigid members each terminate in an elongated slot, said lost motion coupling means each including a pin passing through the associated slot in the direction generally parallel to said axis, the pin being rigidly secured to said elongated head member such that the head member can move a small distance towards and away from the axis of said torque tube as defined by the length of the slots, said biasing means including a spring between a portion of the extending end of the rigid member and the associated pin, urging the pin toward the far end of the slot so that the head is biased its furthest distance from the axis of said torque tube, engagement of the rail engaging means of the head with the rails urging the head towards the axis of the torque tube against the bias of the spring when the arcuate movement of the torque tube reaches said second position, the head motion following the rails when the torque tube moves from the second to the third position, movement of the pin in the slot accommodating the change of arcuate motion of said head to rectilinear motion, the slots themselves moving through precisely equal distances to assure that said opposite ends of said head and thus said drills all move through precisely equal distances towards said work surface.

4. The subject matter of claim 2, in which said first rail engaging means includes tandem pairs of rollers, the rollers in each pair engaging said guide rail at circumferentially spaced points, said second rail engaging means including a single roller engaging said second guide rail.

* * * * *